US007896231B2

(12) United States Patent
Dcosta et al.

(10) Patent No.: US 7,896,231 B2
(45) Date of Patent: Mar. 1, 2011

(54) METHOD AND APPARATUS FOR CHECK STACK VISUALIZATION

(75) Inventors: Ashvil Savio Dcosta, Cupertino, CA (US); Jimmy Wang, Alamo, CA (US); Jonathan Velline, Oakland, CA (US); Elizabeth Ann Schrag, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 11/608,718

(22) Filed: Dec. 8, 2006
(Under 37 CFR 1.47)

(65) Prior Publication Data

US 2008/0135609 A1 Jun. 12, 2008

(51) Int. Cl.
*G06Q 40/00* (2006.01)
(52) U.S. Cl. ...................... 235/379; 235/454
(58) Field of Classification Search ......... 235/379–380; 342/442; 345/419
See application file for complete search history.

(56) References Cited

U.S. PATENT DOCUMENTS

| 4,352,100 | A | * | 9/1982 | O'Connell ................ 345/534 |
| 4,356,221 | A | | 10/1982 | Anthony |
| 4,634,584 | A | | 1/1987 | Grosskinsky |
| 4,649,390 | A | | 3/1987 | Andrews |
| 5,220,501 | A | | 6/1993 | Lawlor |
| 5,912,668 | A | * | 6/1999 | Sciammarella et al. ...... 715/788 |
| 5,963,647 | A | | 10/1999 | Downing |
| 6,131,809 | A | | 10/2000 | Drescher |
| 6,164,638 | A | | 12/2000 | Owens |
| 6,170,818 | B1 | | 1/2001 | Eastman |

(Continued)

FOREIGN PATENT DOCUMENTS

EP 0504287 B1 7/1999

(Continued)

OTHER PUBLICATIONS

Bank One Enhances Customer Deposit with NCR ATM Solution; First North American Bank to Offer No-Envelope ATM Deposits, Image Processing and Retrieval. Business Editors. Copyright 2002 Business Wire.*

(Continued)

*Primary Examiner*—Seung H Lee
*Assistant Examiner*—Sonji Johnson
(74) *Attorney, Agent, or Firm*—Merchant & Gould P.C.

(57) ABSTRACT

A Check Stack Visualization technique is provided and allows an automated teller machine (ATM) user to see a stack of checks on one screen for check amount confirmation. Customers see all the checks on one screen and indicate that the amounts are correct and click to deposit the checks. In one preferred embodiment, a three dimensional (3D) list is used to display the checks on a Bezier curve along with the amounts highlighted. If the optical character recognition (OCR) process failed on a check amount, the technique highlights the check amount in red. If the customer does not think the check amount is correct, the customer can click on the small check image which brings up a larger check image and they can edit the amount. Once the customer is satisfied that the numbers are correct, the customer can click on a deposit all check button to complete the transaction.

19 Claims, 3 Drawing Sheets

U.S. PATENT DOCUMENTS

| | | | |
|---|---|---|---|
| 6,202,054 B1 | 3/2001 | Lawlor | |
| 6,241,244 B1 | 6/2001 | Modi | |
| 6,290,070 B1 | 9/2001 | Graef | |
| 6,302,393 B1 | 10/2001 | Beskitt | |
| 6,318,714 B1 | 11/2001 | Beskitt | |
| 6,328,207 B1 | 12/2001 | Gregoire | |
| 6,331,000 B1 | 12/2001 | Beskitt | |
| 6,394,907 B1 | 5/2002 | Rowe | |
| 6,474,548 B1 | 11/2002 | Montross | |
| 6,554,185 B1 | 4/2003 | Montross | |
| 6,574,377 B1 * | 6/2003 | Cahill et al. | 382/305 |
| 6,607,081 B2 | 8/2003 | Graef | |
| 6,659,341 B1 | 12/2003 | Wang | |
| 6,726,097 B2 | 4/2004 | Graef | |
| 6,745,939 B2 | 6/2004 | Force | |
| 6,866,586 B2 | 3/2005 | Oberberger | |
| 6,941,274 B1 | 9/2005 | Ramachandran | |
| 6,983,880 B2 | 1/2006 | Graef | |
| 6,988,656 B2 | 1/2006 | Scarafile | |
| 7,032,245 B2 | 4/2006 | Scarafile | |
| 7,057,616 B2 * | 6/2006 | Motter et al. | 345/442 |
| 7,136,061 B2 * | 11/2006 | Cordner | 345/419 |
| 7,588,182 B2 * | 9/2009 | Carpenter et al. | 235/379 |
| 2002/0011431 A1 | 1/2002 | Graef | |
| 2002/0038289 A1 | 3/2002 | Lawlor | |
| 2003/0061132 A1 | 3/2003 | Yu, Sr. et al. | |
| 2003/0196936 A1 | 10/2003 | Graef | |
| 2003/0201318 A1 | 10/2003 | Graef | |
| 2004/0064414 A1 | 4/2004 | Silverbrook | |
| 2004/0089711 A1 | 5/2004 | Sandru | |
| 2004/0212141 A1 | 10/2004 | Graef | |
| 2004/0212142 A1 | 10/2004 | Graef | |
| 2004/0215564 A1 | 10/2004 | Lawlor | |
| 2004/0222295 A1 | 11/2004 | Magee | |
| 2004/0245333 A1 | 12/2004 | Kraft | |
| 2005/0040225 A1 | 2/2005 | Csulits | |
| 2005/0065639 A1 * | 3/2005 | Hayduchok | 700/224 |
| 2005/0244932 A1 | 11/2005 | Harding | |
| 2005/0258234 A1 | 11/2005 | Silverbrook | |
| 2005/0258235 A1 | 11/2005 | Silverbrook | |
| 2005/0279822 A1 | 12/2005 | Douglass | |
| 2006/0024690 A1 | 2/2006 | Kao | |
| 2006/0024831 A1 | 2/2006 | Kao | |

FOREIGN PATENT DOCUMENTS

| | | | |
|---|---|---|---|
| EP | 0960499 B1 | | 11/2005 |
| GB | 2258790 A | * | 2/1993 |
| WO | WO91/09370 | | 6/1991 |
| WO | WO97/04411 | | 2/1997 |
| WO | WO01/03012 A1 | | 1/2001 |
| WO | WO01/80145 A2 | | 10/2001 |

OTHER PUBLICATIONS

*ATM Forum Targets User Needs and Desktop Applications*; Broadband Networking News, v 6, n 18, p N/A; Sep. 3, 1996.

Edwards, C.; *Optical Format to Wait for 90nm*; Electronic Engineering Times UK; Sep. 9, 2002.

McKenney, J.L. et al.; *Bank of America: The Crest and Trough of Technological Leadership*; MIS Quarterly v21n3 pp. 321-353; Sep. 1997.

Shan, T.C. et al.; *Service Oriented Solution Framework for Internet Banking*; International Journal of Web Services Research v3n1 pp. 29-48; Jan.-Mar. 2006.

Stack, J.; *Comment: Banks Losing Out in 'Money Revolution'*; American Banker—Aug. 27, 1999; p. 6; vol. 164, No. 165.

Totty, P.; *ATMs in Overdrive*; Credit Union Magazine v71n6 pp. 68-72; Jun. 2005.

Verma, R. et al.; *Redesigning Check-Processing Operations Using Animated Computer Simulation*; Business Process Management Journal v6n1 pp. 54; 2000.

* cited by examiner

METHOD AND APPARATUS FOR CHECK STACK VISUALIZATION

BACKGROUND OF THE INVENTION

1. Technical Field

The invention relates generally to check processing. More particularly, the invention relates to a method and apparatus for allowing an ATM user to see a stack of checks on one screen for check amount verification and confirmation.

2. Description of the Prior Art

Check depositing in automated banking machines are known in the prior art. Automatic banking machines are used to carry out transactions of value. A popular type of automated banking machine is an automated teller machine (ATM). Other types of automated banking machines are used to count and dispense cash. These machines are often used by tellers or customer service representatives in banking and other transaction environments. Other types of automated banking machines are used to make or receive payments, to dispense or receive tickets, travelers checks, scrip, cash, or other documents or items of value, or to electronically check or transfer funds.

Some ATM machines have the capability of receiving checks and other negotiable instruments. Such machines may include a device such as is shown in U.S. Pat. No. 5,422,467. Devices of this type can be used to cancel and produce electronic images of checks which are deposited into an ATM machine. The canceled checks are stored in the machine for later removal by bank personnel.

While such automated banking machines have been available for awhile and have experienced improvements, there still are some drawbacks. There still is not available a convenient and efficient technique for allowing an ATM user to have a sort of access to, such as to see on the ATM display, a stack of checks on one screen for check amount confirmation of each check of the stack. Currently, an automated teller machine uses one screen per check for user confirmation of check amounts.

A discussion on some related prior art concerning currency and document orientation and sorting follows hereinbelow. For example, M. Owens, H. T. Graef, J. Eastman, M. Harty, and A. Junkins, U.S. Pat. No. 6,164,638, *Automated Banking Machine with Currency Recycling Canisters* (Dec. 26, 2000) discuss an automated banking machine identifying and storing documents, such as currency bills deposited by a user. The machine then selectively recovers such documents from storage and dispenses them to other users. The machine includes a central transport wherein documents deposited in a stack are unstacked, oriented, and identified. Such documents are then routed to particular storage areas in recycling canisters. When a user subsequently requests a dispense, documents stored in the storage areas are selectively picked therefrom and delivered to the user through an input/output area of the machine.

As another example, M. Force, T. H. Graef, R. Bowser, J. Eastman, M. Harty, A. Junkins, M. E. Lindroos, M. Owens, M. Ryan, A. Looney, and R. Shirah, U.S. Pat. No. 6,745,939, *Method of Operating a Self-Auditing Automated Banking Machine* (Jun. 8, 2004) similarly discuss an automated banking machine that identifies and stores documents such as currency bills deposited by a user. The machine selectively recovers stored documents and dispenses them. The machine includes a central transport wherein documents deposited in a stack are unstacked, oriented, and identified. Such documents are then routed to storage areas in. Documents in the storage areas are selectively picked therefrom and delivered to a user. Each canister includes a memory which holds information concerning the number and type of documents housed in the canister as well as other information concerning the hardware and software resident on the canister. The memory also includes data representative of individuals responsible for loading and transporting the canister. The machine conducts self-auditing activities to verify that the documents held in the storage areas correspond to the information stored in memory and indicate discrepancies.

In a third example, D. C. McGlamery, K. G. Harrington, R. M. Parsons, and R. G. Belchler, U.S. 2005/0139671, *Method and System for Exception Processing of MICR Documents* (Jun. 30, 2005) discuss a system and method for exception processing of MICR documents. MICR documents are read and sorted to a destination pocket for processing subject to a determination that an exception does not prevent the routing of the document. In example embodiments, for example, an error does not prevent the routing of the document if it is not related to the routing/transit field. In the case of digit errors, an optical character recognition (OCR) process is performed on the stored, electronic image of the document to correct digit errors in the stored data read from the documents. If a determination is made that correction or other exception processing cannot be handled through the OCR process, the image and corresponding MICR data is displayed on a user terminal, for manual verification or correction by reference to an image of the document, rather than the document itself.

As can be gleaned from the above, while there has been some development and progress in the handling of recycling currency or other sheets or documents representative of value received from a customer, or MICR line exception processing, such teachings nevertheless still lack the contemplation of allowing an ATM user to see a stack of checks on one screen for check amount confirmation of each check of the stack.

It would therefore be advantageous to allow an ATM user to see a stack of checks on one screen for check amount confirmation of each check of the stack.

SUMMARY OF THE INVENTION

A method and apparatus for a Check Stack Visualization technique is provided. The Check Stack Visualization technique allows an automated teller machine (ATM) user to see a stack of checks on one screen for check amount confirmation. With the technique, customers can see all the checks on one screen and indicate that the amounts are correct and click to deposit the checks. In one preferred embodiment, a three dimensional (3D) list is used to display the checks on a Bezier curve along with the amounts highlighted. If the optical character recognition (OCR) process failed on a check amount, the technique highlights the check amount in red. If the customer does not think the check amount is correct, the customer can click on the small check image which brings up a larger check image and they can edit the amount. Once the customer is satisfied that the numbers are correct, the customer can click on a deposit all check button to complete the transaction.

DETAILED DESCRIPTION OF THE INVENTION

A method and apparatus for a Check Stack Visualization technique is provided. The Check Stack Visualization technique allows an automated teller machine (ATM) user to see a stack of checks on one screen for check amount confirmation. With the technique, customers can see all the checks on one screen and indicate that the amounts are correct and click to deposit the checks. In one preferred embodiment, a three dimensional (3D) list is used to display the checks on a Bezier curve along with the amounts highlighted. A Bezier curve is a cubic equation that is smooth and that has been found to be used in graphic design and animation software. If the optical character recognition (OCR) process failed on a check amount, the technique highlights the check amount in red. If the customer does not think the check amount is correct, the customer can click on the small check image which brings up a larger check image and they can edit the amount. Once the customer is satisfied that the numbers are correct, the customer can click on a deposit all check button to complete the transaction.

Figure 1:
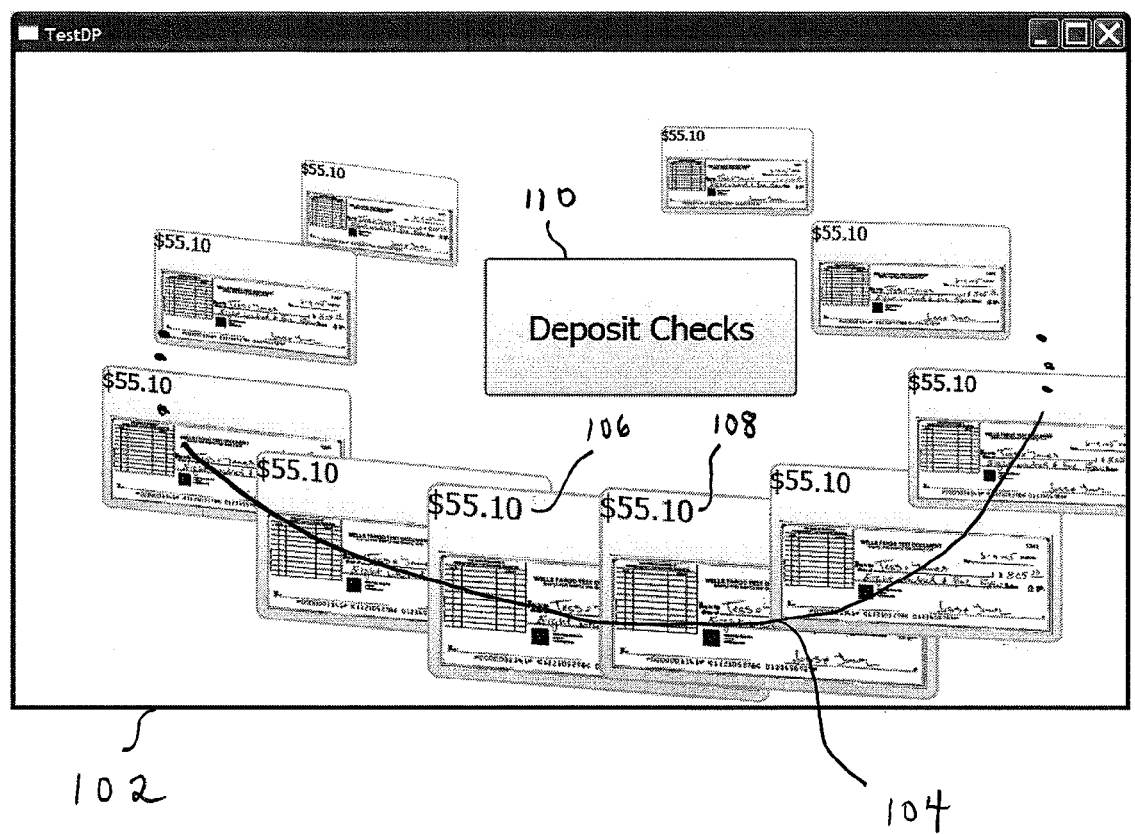
FIG. 1 is an example screen display showing checks from a stack of checks that were input into an automated banking machine according to the invention.

FIG. 1 is an example screen display 102 showing checks from a stack of checks that were input into an automated banking machine according to one embodiment of the invention. In one embodiment of the invention, the checks are presented in an overlapping and efficient manner along a curve 104, such as a Bezier curve. In this way, a customer is able to see a stack of checks on one screen for any purpose, such as for example, for validating and confirming the check amount on each and every check in the stack.

It should be appreciated that the Bezier curve and other similar presentation styles, give the effect of the presentation of checks as being three dimensional. For example, the chosen font of the text check amounts of the checks that are near the center of the display and of the curve are large (106, 108). One skilled in the art can employ a variety of fonts, font styles, sizes, and so on, and other imagery, such as icons, pictures, graphs, clip art, hypertext links, and the like, to attain the same affect, which is to highlight the part of the check which needs validation. In this example, it is the check amount which needs validating.

If the customer confirms the amounts of the checks are correct, the customer can proceed to deposit the checks. Referring to FIG. 1, a Deposit Checks button 110 is displayed for the convenience of the customer as an example implementation.

One embodiment of the invention contemplates that the checks on the curve 104 can be magnified by a variety of means and stay within the scope and spirit of the invention. For example, a pointer can be provided that, when it lands on a check, results in the image of the check on the display being magnified in relation to the other checks, and the other checks either stay at the same scale or shrink in scale. One skilled in the art can appreciate that the design and programming choices of highlighting a particular check as well as a particular part of a check are limitless.

One embodiment of the invention contemplates the stack of checks displayed as a traditional list, such as in row verses column format. The many varieties in displaying a list are limitless.

In one embodiment of the invention, when the OCR fails on a check amount, and the system highlights the amount (106 or 108), such as in red, for example.

Figure 2:
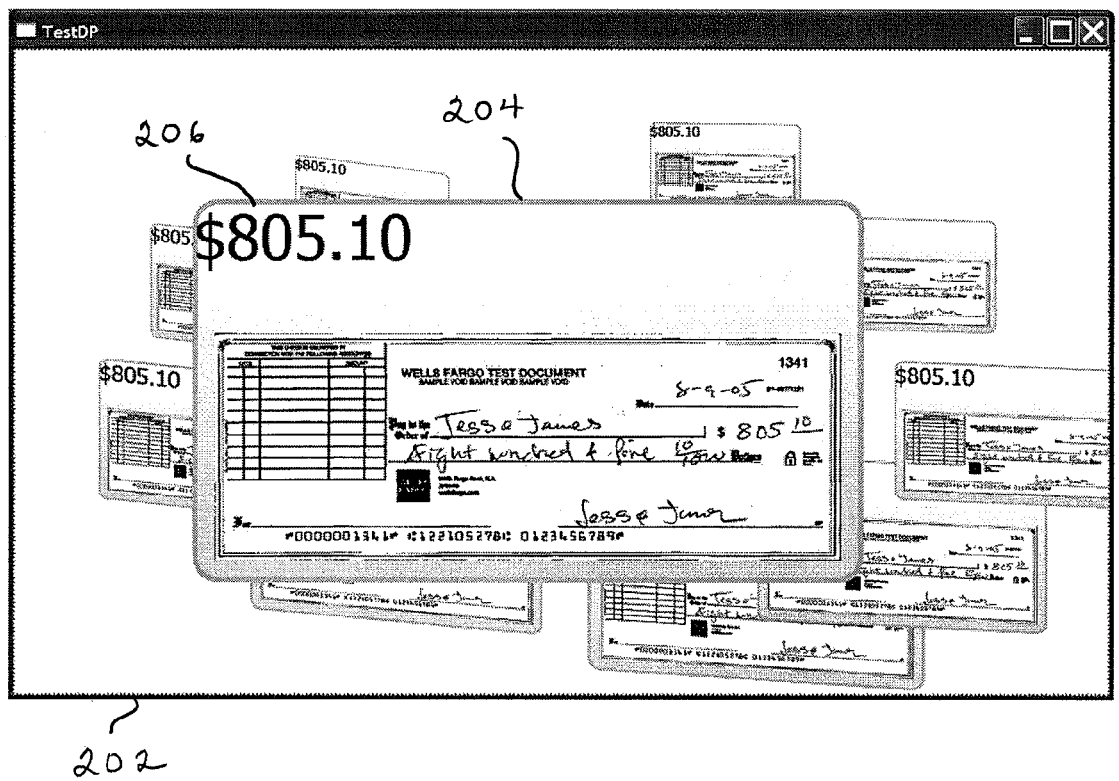
FIG. 2 is an example screen display showing a check that is magnified and centered because it was selected by a user for further processing according to the invention.

If the customer does not think the check amount is correct, the customer can select the check, for example such as clicking or double-clicking anywhere on the check, which results in bringing up a larger check image 204, as shown in FIG. 2. Then the customer or user can edit the check amount 206.

FIG. 2 is an example screen display 202 showing a check 204 that is magnified and centered because it was selected by a user for further processing. For example, the user could have wanted to select this check to see the amount 206 in a larger font to verify that the amount is correct. Or, as another example, the user, after seeing the amount in magnified or otherwise highlighted format, can click on the amount 206 and make appropriate corrections as necessary.

In one embodiment of the invention, the user can return the larger check image back to its previous state by clicking anywhere on the screen other than the check itself. Once the check is returned to its original position, and once the user is satisfied with the corrections made, the user can complete the deposit transaction. For example, the user can click on the Deposit Checks button 110 of FIG. 1.

One embodiment of document verification processing can be described as follows. The process begins with a stack of documents, such as checks, having been deposited or inputting into an automated banking machine or other type of machine, such as a kiosk, for example. Each of the documents are scanned. For example, the documents are checks and the checks are scanned by an OCR scanning apparatus. Images of each of the documents from the stack are subsequently displayed on a screen. For example, the documents are checks and images of the scanned checks are displayed along a Bezier curve. A particular part of each of the documents is highlighted to improve the visibility to the user. For example, the check amounts of each displayed check image are highlighted. If the content of the particular part of the document is not correct, the content is highlighted in a different way to offset it and to increase the chance that the user will notice the incorrect content. In the example above, if the OCR scan had failed on a check amount, the system highlights the check amount in red. If the user does not think that the highlighted and offset content is correct, the user can select the document to enlarge it and subsequently edit the content, if desired. Continuing with the same example, if the customer does not think the check amount is correct, the customer can click on the image of the check which brings up a larger check image. The customer can then edit the amount. Once the user is satisfied with the content, whether or not it had been edited for correction, the user can indicate that processing the document can continue. In the example, once the customer is happy with the check amount, the customer can click on the Deposit Checks button to complete the transaction.

Figure 3:
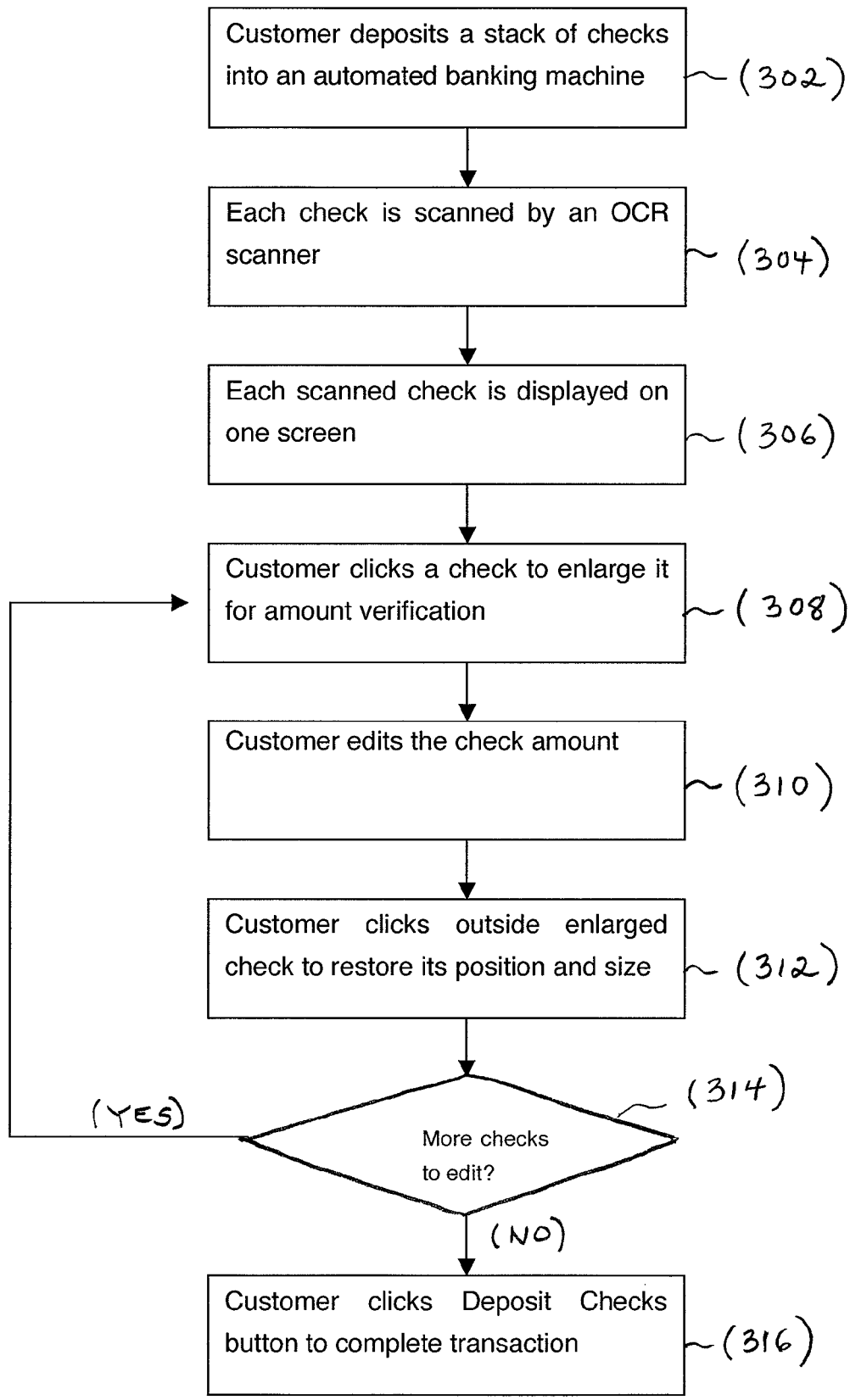
FIG. 3 is a flow diagram of an example implementation of check stack visualization according to the invention.

FIG. 3 is a flow diagram of an example implementation of check stack visualization according to the invention. A stack of checks are deposited into an automated banking machine (302). Each check is scanned by an OCR scanner (304). Each scanned image of the checks is displayed on one screen of the automated banking machine is a Bezier curve with the check amounts highlighted (306). The customer clicks a check to enlarge it for check amount verification (308). The customer edits the check amount (310) to correct it. The customer clicks outside the enlarged check to restore it to its original position and size (312). The customer decides if there are more checks to edit (314). If yes, the customer returns to step (308). If no, the customer clicks a Deposit Checks button to complete the transaction (316).

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for visualizing, verifying, and editing content of a document from a stack of documents used in a transaction using one display screen of a receptacle, comprising:

receiving a stack of three or more documents in a receptacle;

scanning each of the documents to obtain electronic images representing each of the documents, each of the electronic images including text;

concurrently displaying each of the electronic images representing the three or more scanned documents onto a single screen of said receptacle, the electronic images being arranged in an overlapping manner to provide a three-dimensional effect;

receiving a selection of one of said displayed electronic images for content verification, the selection having been made by a user based on the concurrently displayed electronic images representing the scanned documents;

receiving at the receptacle any edits to be made to content of the scanned document represented by the selected electronic image;

receiving an indication that said user unselected said selected electronic image, wherein a font size of the text of the unselected electronic images varies based on a location of the unselected electronic image on the screen of said receptacle; and receiving an indication from said user to complete said transaction when no more electronic images are to be verified.

2. The computer implemented method of claim 1, wherein the document is a check and said receptacle is an automated banking machine.

3. The computer implemented method of claim 1, wherein said scanning step is performed by an optical character recognition (OCR) scanner.

4. The computer implemented method of claim 1, wherein concurrently displaying the electronic image representing each scanned document comprises concurrently displaying the electronic image representing each of the scanned documents in a Bezier curve.

5. The computer implemented method of claim 1, wherein at least one of the scanned documents is displayed with a predetermined part of the displayed content highlighted.

6. The computer implemented method of claim 5, wherein the predetermined part of the displayed content is a check amount.

7. The computer implemented method of claim 1, wherein receiving the selection of one of said displayed electronic images further comprises enlarging said selected electronic image on said screen.

8. The computer implemented method of claim 1, wherein receiving the indication that said user unselected said selected electronic image comprises receiving an indication that said user accessed an area of said display screen outside the selected electronic image and said unselected electronic image returning to an original position and size.

9. A system on a computer network for visualizing, verifying, and editing content of a check from a stack of checks used in a transaction, the system comprising:

a computer receptacle configured to receive a stack of three or more checks, each check having a check amount;

a scanner coupled to the computer receptacle and configured to scan each of the checks to obtain scanned images of each of the checks, the scanner also being configured to read a check amount; and a display screen coupled to the computer receptacle, the display screen configured for concurrently displaying each of the scanned images of the three or more checks, wherein a check amount is visible in each of at least three scanned images being concurrently displayed, and wherein the check amount is highlighted if the scanner failed to read the check amount;

the computer receptacle being configured to receive a user selection of one of the displayed images having the check amount highlighted;

the computer receptacle being configured to receive from said user edits to the highlighted check amount of said selected image;

the computer receptacle being configured to receive from said user an indication unselecting said selected image;

the computer receptacle being configured to provide an indicator enabling said user to complete said transaction if no more checks are to be verified.

10. The system on a computer network of claim 9, wherein said receptacle is an automated banking machine.

11. The system on a computer network of claim 9, wherein said scanner includes an optical character recognition (OCR) scanner to read the check amount.

12. The system on a computer network of claim 9, wherein each scanned image is displayed in a Bezier curve.

13. The system on a computer network of claim 9, wherein the check amount is highlighted in red.

14. The system on a computer network of claim 9, wherein the computer receptacle is configured for enlarging said selected scanned image on said display screen.

15. The system on a computer network of claim 9, wherein said computer receptacle comprises means for clicking outside the image on the screen and means for said image returning to an original position and size.

16. A computer implemented method for visualizing, verifying, and editing content of a check from a stack of checks used in a transaction using one display screen of an automated banking machine, the method comprising: receiving a stack of at least three checks in an automated banking machine, each check being associated with a check amount;

scanning each of the at least three checks using an optical character recognition (OCR) scanner to obtain electronic images representing each of the checks including the associated check amount;

concurrently displaying, in a Bezier curve, each of the electronic images representing the at least three scanned checks onto a single screen of said automated banking machine, wherein the check amounts of at least three of the electronic images are concurrently visible, and wherein at least one of the electronic images is displayed with the check amount highlighted;

receiving a selection of one of said displayed electronic images for content verification, the selection having been made by a user based on the concurrently displayed electronic images representing the scanned checks;

enlarging the selected electronic image on said screen;

receiving at the automated banking machine any edits to be made to content of the scanned check represented by the selected electronic image;

receiving an indication that said user accessed an area of said display screen outside the selected electronic image to unselect the electronic image, wherein a font size of text of the unselected electronic image varies based on a location of the unselected electronic image on the screen of said receptacle;

returning the selected electronic image to an original position and size on said display screen; and completing said transaction when no more electronic images are to be verified.

17. The computer implemented method of claim 16, wherein the electronic image of a first of the at least three scanned checks is positioned centrally in the Bezier curve, and wherein concurrently displaying each of the electronic images comprises displaying text of the first scanned check as larger than text of another of the at least three scanned checks.

18. The computer implemented method of claim 16, wherein completing said transaction comprises receiving an indication that said user selected a Deposit Check option on the screen of said automated banking machine.

19. The computer implemented method of claim 16, wherein the check amounts of all of the electronic images are concurrently visible on the screen of said automated banking machine.

* * * * *